March 28, 1967 S. W. ALDERSON 3,310,885
RADIO-THERAPY PHANTOM
Filed June 4, 1964 3 Sheets-Sheet 1
FIG. 1
FIG. 2
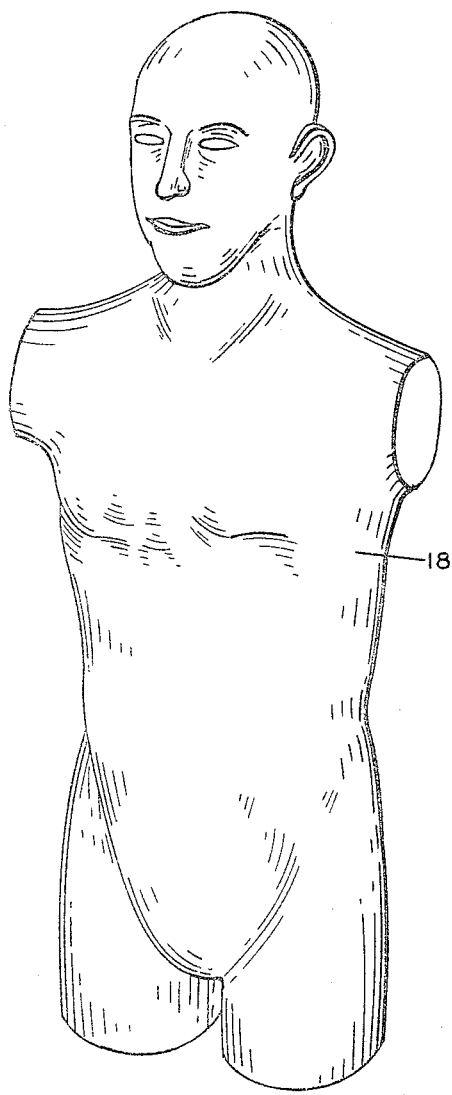
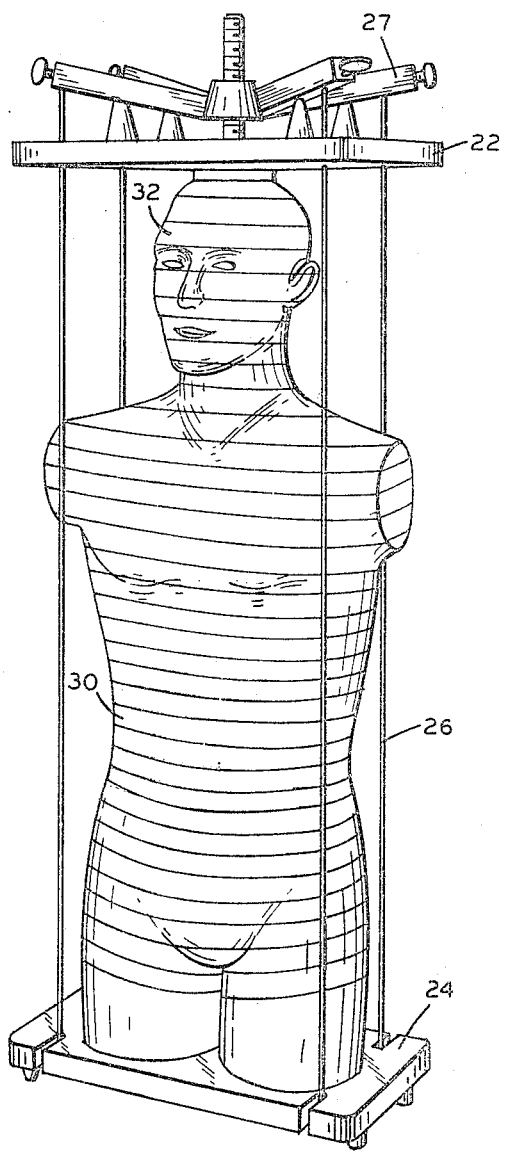
INVENTOR.
SAMUEL W. ALDERSON
BY John P. Chandler
HIS ATTORNEY.

INVENTOR.
SAMUEL W. ALDERSON

March 28, 1967  S. W. ALDERSON  3,310,885
RADIO-THERAPY PHANTOM
Filed June 4, 1964  3 Sheets-Sheet 3
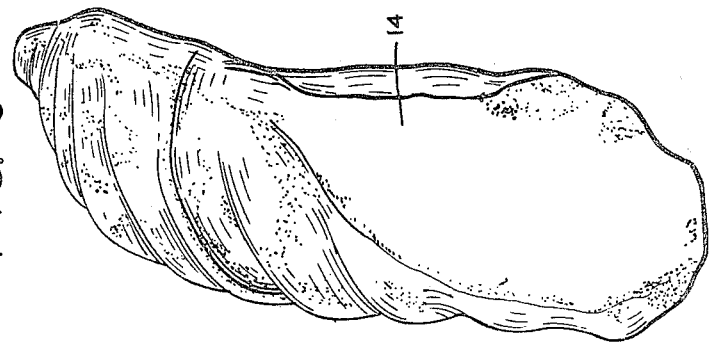
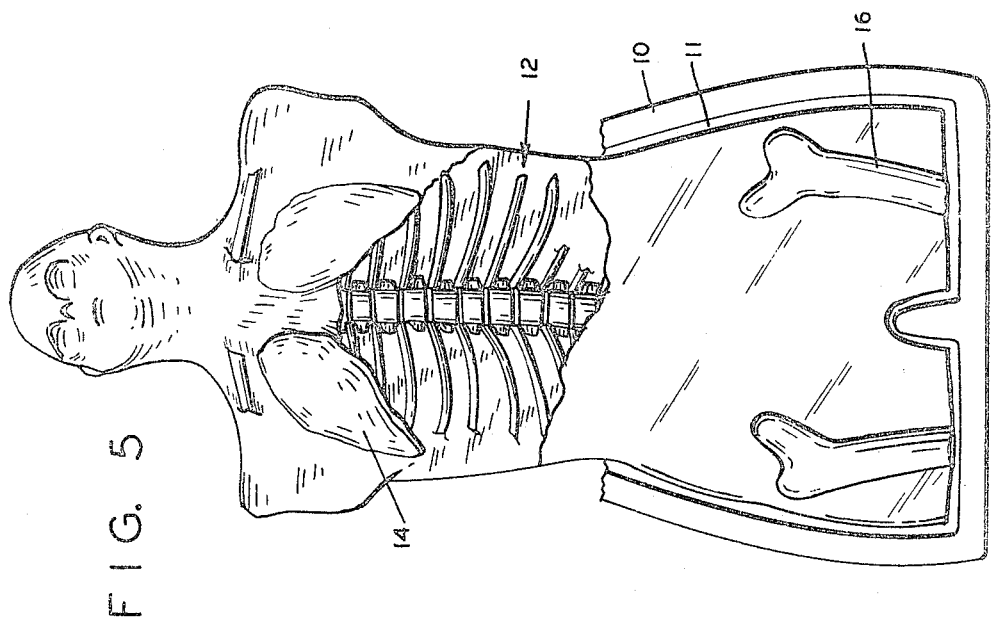
INVENTOR.
SAMUEL W. ALDERSON
BY
*John P. Chandler*
HIS ATTORNEY.

United States Patent Office 3,310,885
Patented Mar. 28, 1967

3,310,885
RADIO-THERAPY PHANTOM
Samuel W. Alderson, 650 West End Ave.,
New York, N.Y. 10025
Filed June 4, 1964, Ser. No. 374,561
10 Claims. (Cl. 35—17)

This application is a continuation-in-part of my co-pending application Ser. No. 119,252, filed June 21, 1961, now abandoned.

This invention relates to a radiotherapy phantom and has for its principal object the provision of a phantom or dummy simulating as closely as possible the human body and which is useful in improving the accuracy of radiotherapy and in determining how radiation is absorbed by the human body.

The treatment of malignant disease by radiation is handicapped by a number of extraordinary difficulties. Generally, these difficulties relate to the determination of the actual distribution of absorbed dose within the patient's body. If the dose at any point within the tumor is too low (less than the so-called "tumor lethal dose"), all malignant cells are not destroyed; they will continue to grow and eventually will cause death. If the tumor is not destroyed completely in a single course of treatment lasting up to a few weeks, a second course of treatment is almost certain to fail, since the cells of the tumor will have become radio-resistant, and the tolerance of the body to therapeutic radiation will have been reduced.

An accurate treatment might be determined empirically if the patient could be transected and instrumented so that X-ray tubes, cobalt–60 beams, radium, or other radiation sources could be placed to best advantage and adjusted for optimum output. This is obviously impossible. In fact, the radiotherapist can generally measure only entrance and exit doses and only occasionally can he insert a dosimeter within a body cavity for a few isolated measurements. These dose measurements are totally inadequate, since many closely-spaced measurements are needed within the body to establish the adequacy of the treatment from all of the aspects discussed above. Since treatments cannot be developed empirically by patient measurements, they must be computed without hope of adequately checking the resulting dose distribution. Computation may be very laborious, and, in fact, electronic computers are being used. The results are highly uncertain, since the contours and composition of the body are complex and difficult to embrace within mathematical formulae.

The present invention relates to a simulated patient, or phantom, which will absorb radiation like a human, but which will be readily accessible for as many internal dose measurements as are desired. In its general form, it will serve to determine dose distributions applicable to patients of similar size and body build. By employing such phantoms in a range of sizes and body builds, it will be possible to pre-test and modify treatments for a substantial fraction of cancer patients.

A number of approaches have been made previously to the construction of phantoms for determining internal dose distributions for corresponding humans. None has been developed previously which adequately meets the requirements for a phantom which can be substituted for a patient in testing clinical treatments. One type of phantom has been molded solidly in various plastic materials, but they do not contain skeletons, which make them unsuitable for obtaining dose distribution which would exist in corresponding humans. Further, there are no means provided for making extensive measurements at whichever part of the head or trunk is to be treated.

Another type of phantom is based upon the use of contoured laminations of "Masonite" (synthetic wood) or other rigid materials, which are only approximately tissue-equivalent. Again, such phantoms do not have skeletons, and the materials, being hygroscopic, are not stable with respect to tissue-equivalence. Although suitable for use of film between laminations, no means are provided for other types of dosimetry. One phantom, as reported in Life magazine, was an extension of the laminated Masonite. Bones were cut and inserted separately in large cutouts in each lamination and were secured within the lamination by wax poured into the surrounding air spaces. No means were provided in this phantom for extensive dose measurements; it was intended only for making selected measurements at predetermined locations as required by specific research problems. This phantom had no clinical applications in radiotherapy. It also suffered from hygroscopic materials, a lack of uniformity of the wax and Masonite materials in their properties of absorbing radiation, and general mechanical instability.

Prior skilled workers in the art have failed to disclose a phantom which could be used routinely in the radiotherapy clinic for patient simulation, which contains a natural human skeleton in true relationship to the body contours, and which has soft-tissue equivalent materials which are stable and accurate.

Prior art also fails to disclose any satisfactory simulation of the human lungs with respect to radiation-absorption properties. Materials such as special sawdust, rice flour, and ground rice hulls have been used. All of these materials are hygroscopic, subject to attack by vermin, and require external containers to retain the material. Such lungs are not capable of receiving instrumentation for measurement of dose distribution.

One object of the present invention is to provide a phantom which duplicates the human body closely enough for effective use as an analog for treatment development. Another object of this invention is to provide such a phantom which can be instrumented in any region of interest by means of miniature ionization chambers, film sections, or other types of dosimeters. Another object of the present invention is to provide a phantom whose materials absorb radiation like corresponding body structures and which remain accurate and stable. Another object of this invention is to provide a phantom which will be durable and capable of withstanding repeated clinical usage. Another object of this invention is to provide a phantom which can be readily disassembled, instrumented, and re-assembled for making dose-distribution measurements. Another object of this invention is to provide a phantom of which a relatively small portion, such as the head, for example, can be used, so that handling and setup problems will be simplified in the clinic. Another object of this invention is to provide lungs which duplicate human lungs in the absorption of radiation. Still another object of this invention is to provide lungs in mechanically stable forms, and which can be made broadly accessible for instrumentation to measure dose distributions. Another object of this invention is to provide such a phantom which can be manufactured in quantity at a relatively low cost, and which will be sufficiently uniform to permit the interchange of data between cancer-treatment centers.

The phantom consists of head, trunk, and upper legs of an average-size American male, although it can obviously be constructed to any desired size or of the female sex. It contains a natural human skeleton, lungs and soft tissues, equivalent to the human in radiation-absorption, and air spaces duplicating the air-filled interiors of the sinuses, trachea and stem bronchi. The phantom is sectioned transversely to the longitudinal axis of the body by sawing into slices. The bones are infused with a soft-tissue equivalent material which simulates the composite oils, marrow, and connective tissues. The sawed surfaces are then coated with tissue-equivalent plastic and finished to a smooth, flat surface so that they may be clamped together in intimate contact and without air spaces.

In the drawings:

FIG. 1 is a front elevation of the phantom of the present invention after it has been molded and before it has been cut transversely into horizontal sections of desired thickness;

FIG. 2 is a similar view after the sectioning has been completed and the re-assembled parts mounted in a frame;

FIG. 5 is a plan view of the lower half mold with the human skeleton in place and the mold partially filled with the plastic; and FIG. 6 is a perspective view of a molded lung section.

Figure 3:
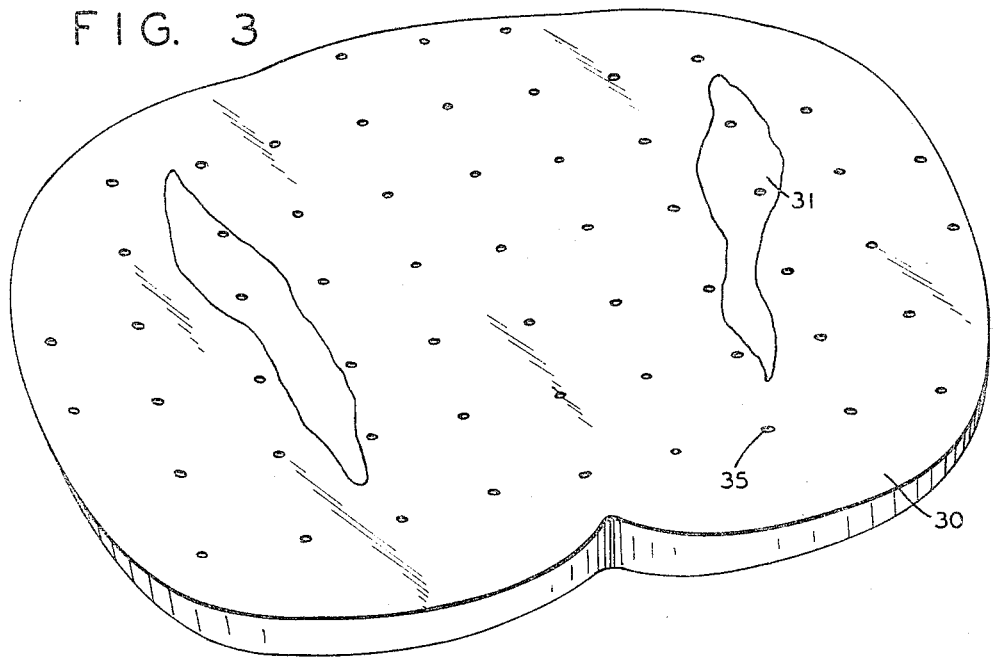
FIG. 3 is a perspective view of one of the body sections.

Two half molds are used in constructing the phantom of the present invention, the first for forming the rear half of the body and the other for the front half. The line of separation runs from the skull down the torso. The upper and lower appendages, excepting the head, are not used.

A portion of the first mold is shown at 10 in FIG. 5 and it may be formed from plastic material or Fibreglas with a synthetic rubber lining 11 which may be about one-half inch in thickness. The mold 10 may have recesses to receive and temporarily hold in place the vertebrae section of the human skeleton before the plastic for the outer layer of the phantom is poured into the rubber-lined mold. The entire skeleton 12 is first placed in the mold with the ribs tied or otherwise secured in spaced relation to the rubber liner. Also the simulated lungs 14 are secured in place within the ribcage.

The prescribed plastic is then poured into the first half of the mold level with the margins around the separation line. The rubber liner has a few vertical openings through which the fluid plastic flows to mold 10 to form bosses or spacers. The upper thigh bones 16 may project above this level and the same is true of the front of the ribs and lungs. After the plastic material had solidified it is removed from the first half mold with the skeleton and lungs embedded therein. The rubber liner is removed and the cast plastic unit returned to outer mold 10 where it is supported in spaced relation to the walls thereof on the bosses. The second half mold (not shown) is now placed over the first which is formed so that the edges of the second half are coextensive with the edges of the hardened plastic unit.

The second mold has a shape corresponding to the front half of the figure shown in FIG. 1 and is provided with suitable pouring openings for the fluid plastic. When the pouring is complete the phantom, shown at 18, is formed and as soon as the plastic is set the phantom is cut, as by the use of a bandsaw, into horizontal sections about one inch in thickness.

The individual slices 30 are now mechanically trimmed and finished. Any air spaces are filled and the cut sections are coated and machined to a proper surface texture.

The soft-tissue equivalent plastic must have the same effective atomic number as a composite of muscle, fat, organ tissue, connective tissue, skin, blood and other body constituents. At low therapeutic voltages, produced by ordinary X-ray therapy apparatus, absorption is largely a function of effective atomic number.

At higher energies, such as produced by radium, cobalt-60, caesium-137, betatrons, and other devices, absorption is primarily dependent upon mass density (or specific gravity), so that the plastic must also be adjusted to match the composite soft-tissue specific gravity. Data on specific gravity and chemical content for determining effective atomic number, are sparse for the human body; the values used here reflect the best available information, but the processing of the plastic material provides for other values if found more accurate as new data are available.

The material actually used is an isocyanate rubber in a castable formulation. In and by itself, it does not have the necessary values of specific gravity and effective atomic number. These are achieved by two steps; the material is partially de-aerated to achieve a constant specific gravity, otherwise entrapped air would cause unmanageable variations. To the material is added a quantity of "microballoons," made from phenolic resin, which are very small gas-filled particles. These have the effect of foaming the material mechanically and in a controlled manner. This technique produces a fine, so-called "syntactic" foam, easily controlled to within .010 of the selected value of .986 for specific gravity of composite human soft tissues.

Without further processing, this material has an effective number which is too low, due to the predominance of carbon (atomic number 6), whereas muscle tissue and water, which are the principal soft-tissue constituents, are predominantly oxygen, with an atomic number of 8; the effective atomic number of composite tissue is now taken as 7.30; the isocyanate rubber, adjusted to specific gravity of .986, would have an effective atomic number of about 6.5. By utilizing the well-known Spiers' formula, a quality of material of high atomic number may be computed to adjust the isocyanate rubber to the desired value. Antimony trioxide was chosen (atomic number 51 for antimony); such a small quantity is needed that specific gravity is not shifted appreciably.

It is obvious that accurate simulation of lungs is needed, since they occupy substantial body volumes and have a far lower specific gravity (.3 average) than soft tissues. Lungs are molded separately in substantially the shape of human lungs of an epoxy resin with a large quantity of phenolic micro-balloons. They are adjusted for .32 specific gravity, then to effective atomic number as described above.

The natural human skeleton which is required in the present phantom must introduce no extraneous materials in its articulation, and it must everywhere be in true relationship to the volume and contours of the body.

The isocyanate rubber formulation to simulate soft tissues is molded in a minimum of three stages although it could conceivably be reduced to two stages. The first stage consists of an envelopment by the plastic of the vertebrae, except for the spinous projections on the posterior side of each vertebra; it also envelops the bones of the pelvis, the base of the skull, the mandible or jaw bone, and the scapulae. This molding also includes projections out to the outer contours of the body.

These bones are related to each other and to body contours on rubber 11 which serves as a holding jig, shown in FIG. 5, which fits precisely within a portion of the body mold 10. This jig contains holes, so that when the first rubber layer is poured, it penetrates the holes and meets the mold wall, thus giving a positive registration of the skeleton 12 to the contours of the body. The pour, when cured, knits together the bones noted above. A second layer is poured after the lungs, sternum, clavicles, and upper parts of the femurs have been positioned and clamped in a jig. This layer, after curing, knits together these components.

Thereafter, cast-wax replicas of the trachea and stem bronchi are inserted and air spaces present in the human body are taken care of by filling these areas with wax, which is later removed leaving appropriate voids. A final casting operation is now begun when the holding jigs are removed and the mold is closed by the front half shown in FIG. 1. This latter stage can consist of several stages of casting in accordance with the size of the batches of isocyanate rubber which are processed.

The molded phantom is then sliced transversely at about one-inch intervals. Since the slices must be brought to a smooth surface finish, and since a grinding operation is not feasible on a surface of mixed bone and isocyanate rubber, materials must be added to build up a flat surface. Each slice is finished to 2.5 cms. or .984 in. As sawed, each slice is approximately .965 in., but only .019 in. of material is added to replace the 0.35 in. lost in the saw cut. This process provides for a minimum of distortion, by keeping the soft-tissue equivalent coating thin over the bones. Skeletons are prepared by a maceration process which removes all soft-tissue components, reducing the bone weight to between ⅓ and ¼ of the original weight. These lost constituents must be replaced for accuracy of the phantom. An impregnation process, using the tissue-equivalent isocyanate rubber is employed.

Figure 4:
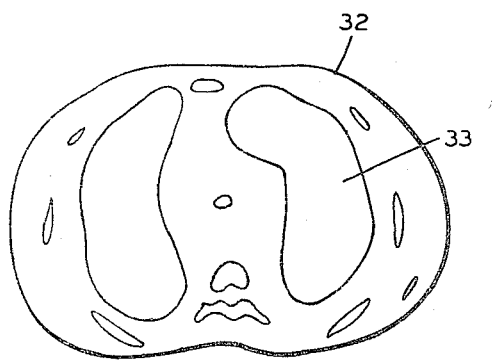
FIG. 4 shows a perspective view of a section of the thorax.

While the cut sections may be used individually for radiation therapy it is preferred to re-assemble them as shown in FIG. 2 and mount them within a frame comprising upper and lower supports 22 and 24 connected by rods 26 with tensioning means to hold the sections tightly together. The tensioning means may comprise a spider to the arms 27 of which the rods are secured, the spider being provided with conventional screw means for raising it upwardly relative to upper support 22. A section 30 from the body is shown in FIG. 3 with its embedded skeleton portion 31 and, in FIG. 4, a section 32 from the head with a portion of the skull shown at 33. The body section 30 is shown as provided with openings 35 to receive ionization chambers, or other dosimeters, later referred to.

The transverse sections are registered by insertion of plastic pins containing a ball at one end and a socket on the other. Two such pins are used in each section, although a larger number might also be used. Each section mates thus with sections on either side to maintain them in alignment. Thus, when sections are compressed axially by the frame, they maintain the contours of the human body.

The phantom is capable of instrumentation in a variety of ways; X-ray film may be placed between any pair of interfaces to measure the distribution of absorbed dose throughout any desired cross-section of the head or trunk. Alternately, ionization chambers may be inserted into holes drilled through the slices to provide similar dose information. Other means of measuring dose distribution may be employed, since the phantom is separable at every 2.5 cms., and the slices are desired to permit insertion of such measurement means at will.

What I claim is:

1. A dummy copy of the human body for matching the absorption characteristics of the human body to penetrating radiation comprising, a human skeleton positioned within said copy and a quantity of moldable material surrounding the skeleton, said material having substantially the same average atomic number and substantially the same average specific gravity as human soft tissues, said material composed of a castable plastic compound mixed with at least ⅒ of 1% by weight of powdered material having an atomic number greater than 30, said compound also mixed with a plurality of particles enclosing air spaces, said particles having a diameter which is less than 2 mm., and said particles comprising at least 5% by weight of said material.

2. A dummy copy as claimed in claim 1 wherein said copy is cut into a plurality of parallel faced components to aid in the insertion of radiation measuring devices.

3. A dummy copy as claimed in claim 1 wherein said skeleton components are impregnated by a plastic material to match the radiation absorption characteristics of bone marrow.

4. A dummy copy as claimed in claim 1 wherein said molded material contains cavities for holding radiation measuring devices.

5. A dummy copy as claimed in claim 2 wherein said components are held together by an external clamping means.

6. A dummy copy as claimed in claim 1 wherein said particles having air spaces are made of castable plastic and have a specific gravity less than one-half.

7. A dummy copy as claimed in claim 1 wherein the skull portion of the skeleton is filled with a castable plastic having substantially the average atomic number and average specific gravity of the human skull.

8. The method of forming a radiation equivalent phantom simulating the human body which consists of adding to a heavy, moldable plastic, which cures to a strong solid material, a quantity of gas-filled particles to cause it to match the specific gravity of human soft tissues when cured, adding to such material a minor quantity of materials with an atomic number greater than the effective atomic numbers of human soft tissue such that the composite material is also matched to the effective atomic number of human soft tissues, and locating the bones of a human skeleton, and separately molded plastic lungs, in holding means within a mold such that these elements may be fastened together by this aforesaid molding material and such as to permit subsequent removal of the holding means and complete encapsulation of these elements within a fully molded human form.

9. A plurality of transverse sections, each having holes in grid array, forming a radiation-equivalent phantom comprising a human skeleton and radiation-equivalent plastic lungs and an enveloping molding therefor made from tissue-equivalent material to form the contours of the human body.

10. A radiation-equivalent phantom lung comprising phenolic micro-balloons, a resin binder and added heavy elements, and having the specific gravity, the effective atomic number and the contour of a human lung.

References Cited by the Examiner

UNITED STATES PATENTS

| | | | |
|---|---|---|---|
| 727,140 | 5/1903 | Hill et al. | 35—41 X |
| 1,953,249 | 4/1934 | Michel | 35—17 X |
| 1,980,483 | 11/1934 | Hill | 35—20 X |
| 3,010,223 | 11/1961 | Alderson | 35—17 |

OTHER REFERENCES

Alderson Research Laboratories Inc. Pamphlet on Radiation-Equivalent Mankin-Absorption, September 1960; pp. 3, 6, 8, 9, 10, and 12.

Applied X-rays by Clark 1955, p. 176.

Life magazine vol. 50, No. 11, Mar. 17, 1961, pp. 73, 74, 76 and 78.

Radiology Physics 2d edition by Robertson 1948, p. 208.

Science News Letter for July 23, 1949, p. 53.

EUGENE R. CAPOZIO, *Primary Examiner.*

JEROME SCHNALL, *Examiner.*

H. S. SKOGQUIST, *Assistant Examiner.*